US012338100B2

(12) United States Patent
Jung et al.

(10) Patent No.: US 12,338,100 B2
(45) Date of Patent: Jun. 24, 2025

(54) BALANCING APPARATUS AND BALANCING SYSTEM COMPRISING SAME

(71) Applicants: Jeung Ja Jung, Seoul (KR); Min Sik Park, Seoul (KR); Min Woo Park, Seoul (KR)

(72) Inventors: Jeung Ja Jung, Seoul (KR); Min Sik Park, Seoul (KR); Min Woo Park, Seoul (KR); Yong Tae Park, Seoul (KR)

(73) Assignees: Jeung Ja Jung, Seoul (KR); Min Sik Park, Seoul (KR); Min Woo Park, Seoul (KR)

( * ) Notice: Subject to any disclaimer, the term of this patent is extended or adjusted under 35 U.S.C. 154(b) by 0 days.

(21) Appl. No.: 18/843,773

(22) PCT Filed: Mar. 3, 2023

(86) PCT No.: PCT/KR2023/002897
§ 371 (c)(1),
(2) Date: Sep. 4, 2024

(87) PCT Pub. No.: WO2023/167519
PCT Pub. Date: Sep. 7, 2023

(65) Prior Publication Data

US 2025/0108996 A1 Apr. 3, 2025

(30) Foreign Application Priority Data

Mar. 4, 2022 (KR) ........................ 10-2022-0028004

(51) Int. Cl.
*B66B 11/06* (2006.01)
*B66B 11/00* (2006.01)

(52) U.S. Cl.
CPC .......... *B66B 11/06* (2013.01); *B66B 11/0055* (2013.01); *B66B 11/0065* (2013.01)

(58) Field of Classification Search
CPC ............. B66B 11/0055; B66B 11/0065; B66B 11/007; B66B 11/0075; B66B 11/06
See application file for complete search history.

(56) References Cited

FOREIGN PATENT DOCUMENTS

| | | | |
|---|---|---|---|
| EP | 1754680 | 2/2007 | |
| JP | 2012-020829 | 2/2012 | |
| KR | 10-1917222 | 1/2019 | |
| KR | 10-2002133 | 7/2019 | |
| KR | 10-2077124 | 2/2020 | |
| WO | 2005-121008 | 12/2005 | |
| WO | WO-2021002732 A1 * | 1/2021 | ......... B66B 11/0065 |

* cited by examiner

*Primary Examiner* — Minh Truong
(74) *Attorney, Agent, or Firm* — LEX IP MEISTER, PLLC

(57) ABSTRACT

According to one aspect of the present invention, provided is a balancing system comprising: an elevator winding drum connected to an elevator car; a center gear part connected to a first driving shaft of the elevator winding drum and including a first center gear; and an outer gear part including a first outer gear which contacts and rotates with the first center gear, and, when the elevator winding drum receives force in a first direction by the elevator car, the center gear part applies force with respect to the elevator winding drum in the opposite direction of the first direction by the force applied from the outer gear part.

5 Claims, 12 Drawing Sheets

【FIG. 1】
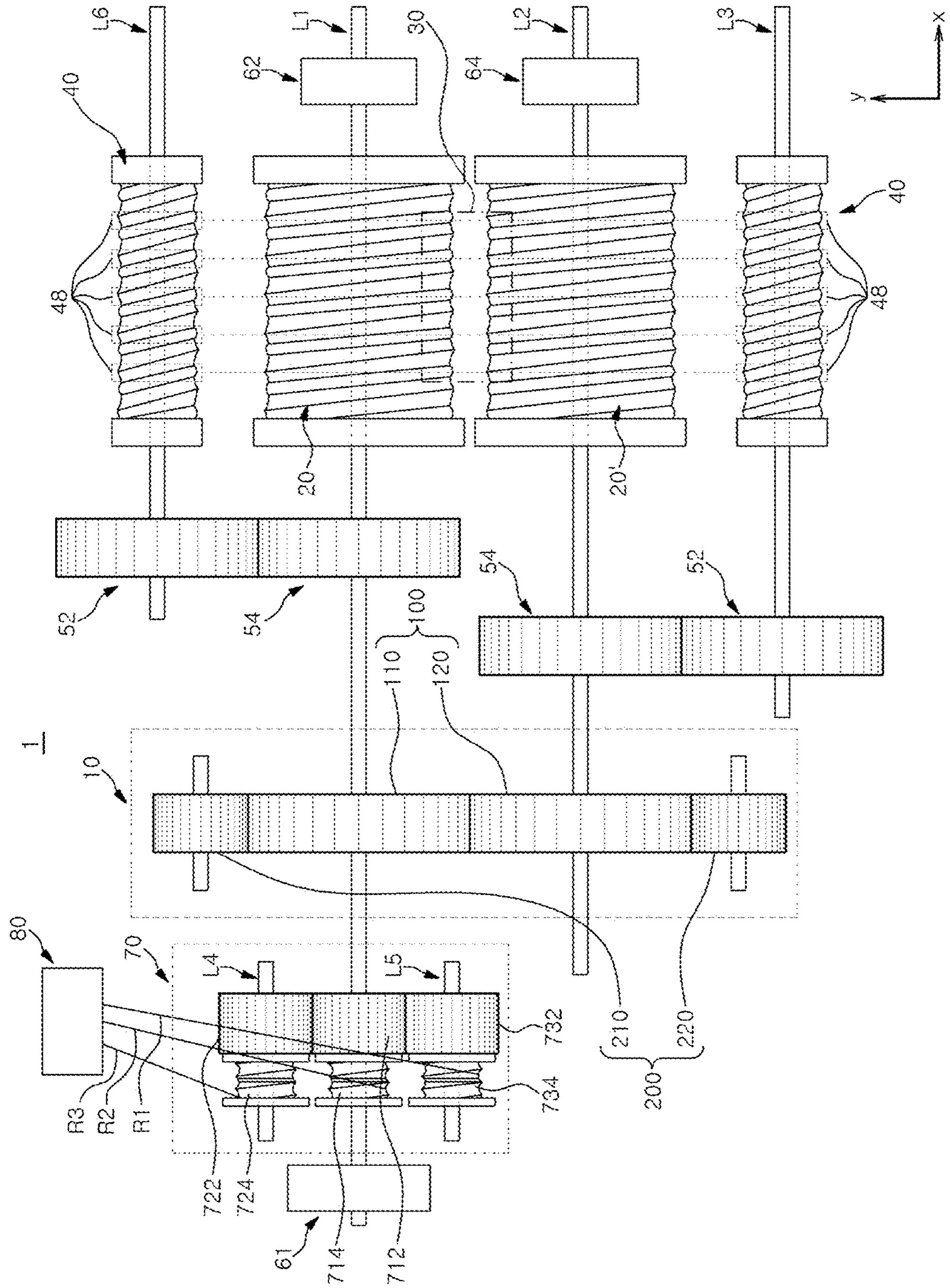

【FIG. 2】
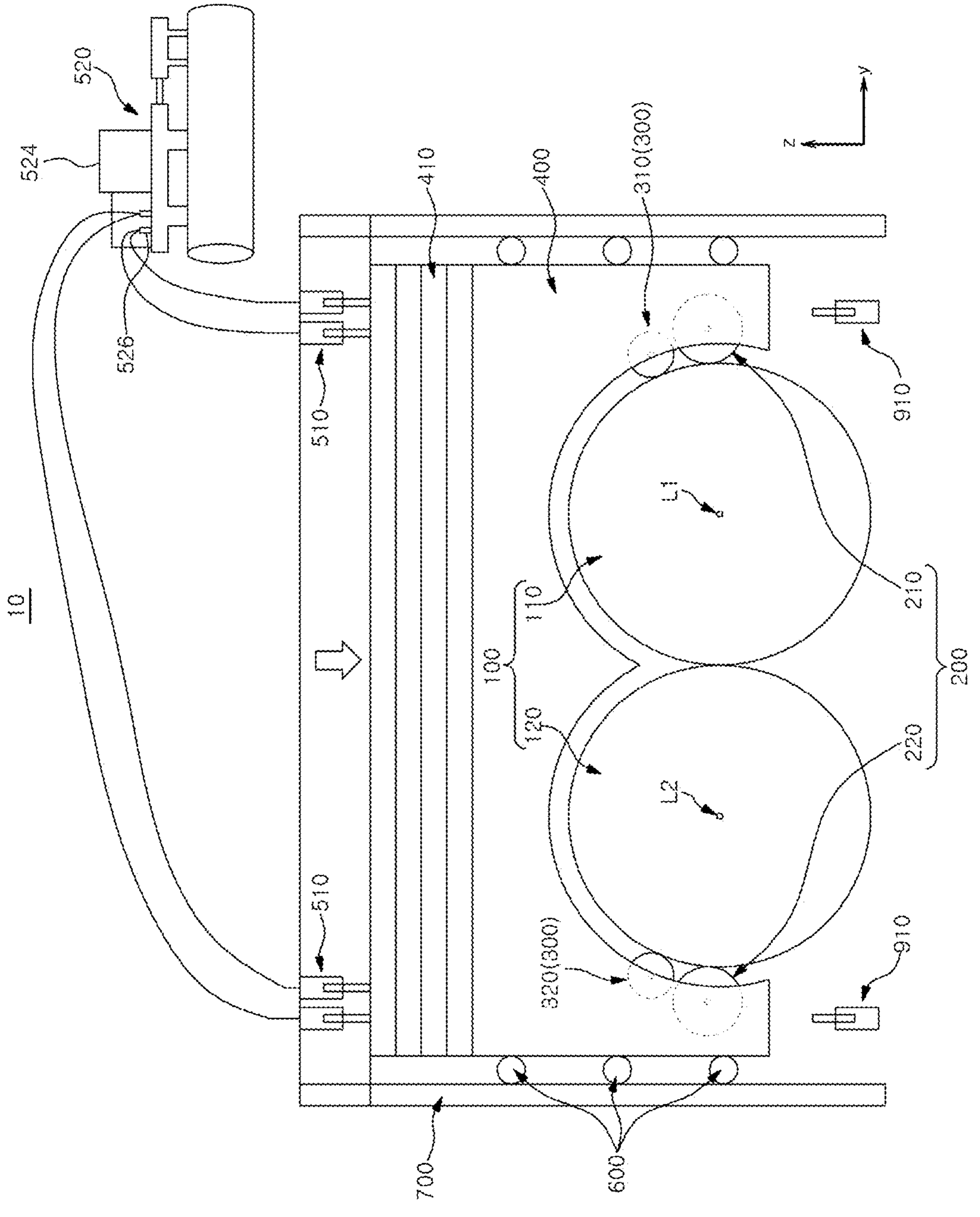

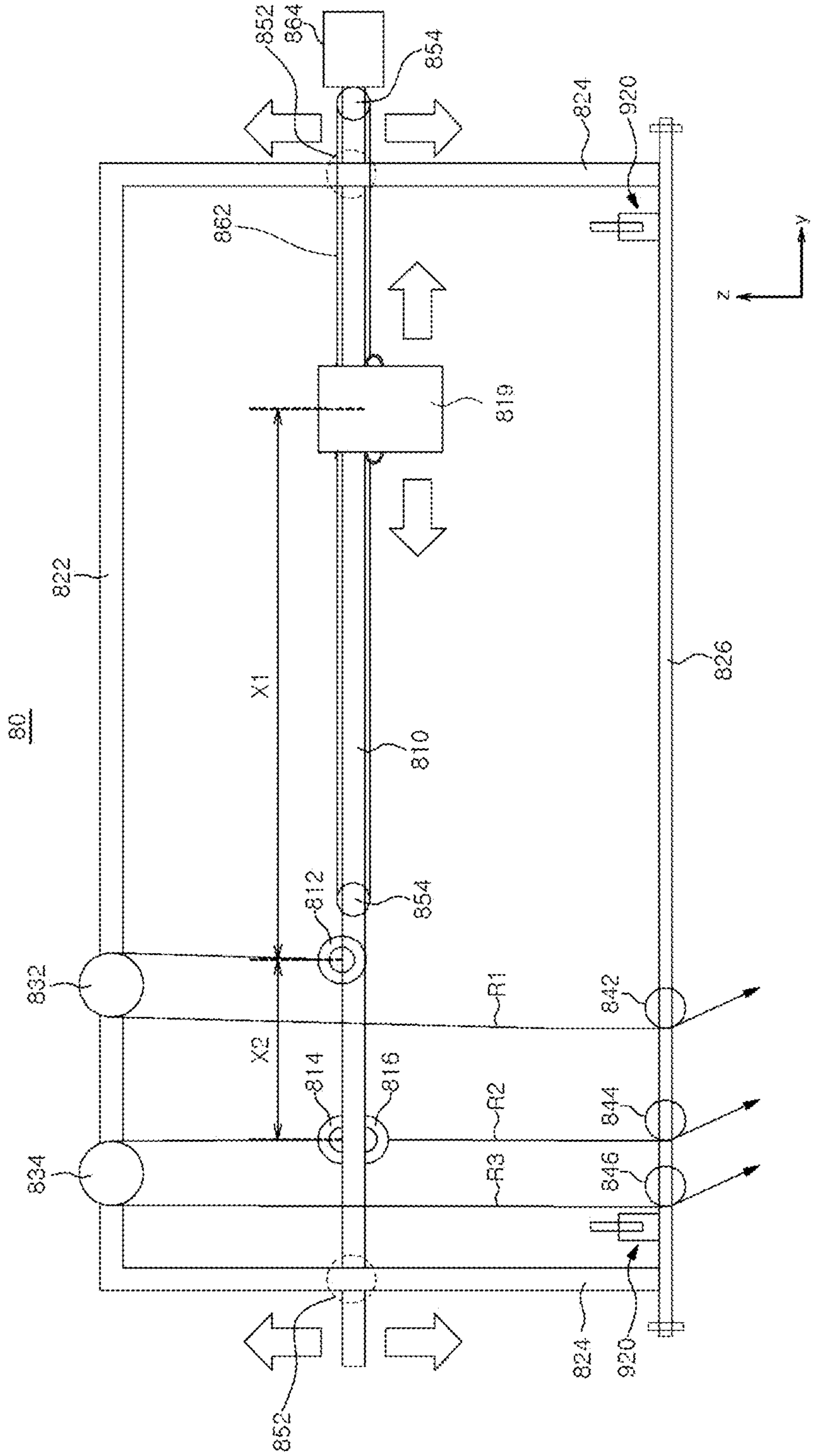
【FIG. 3】

【FIG. 4】
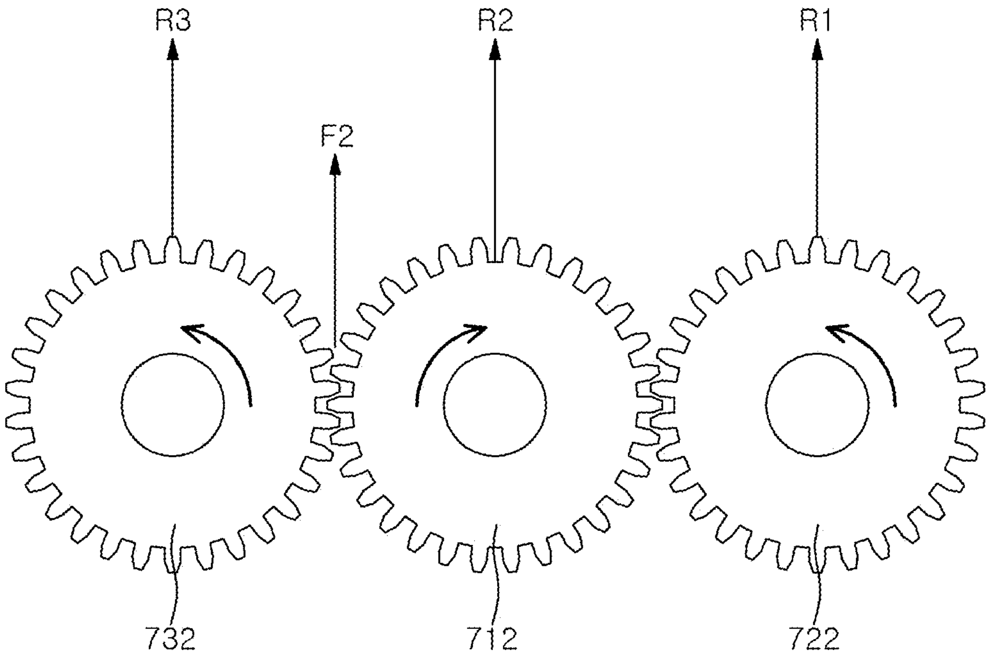

【FIG. 5】
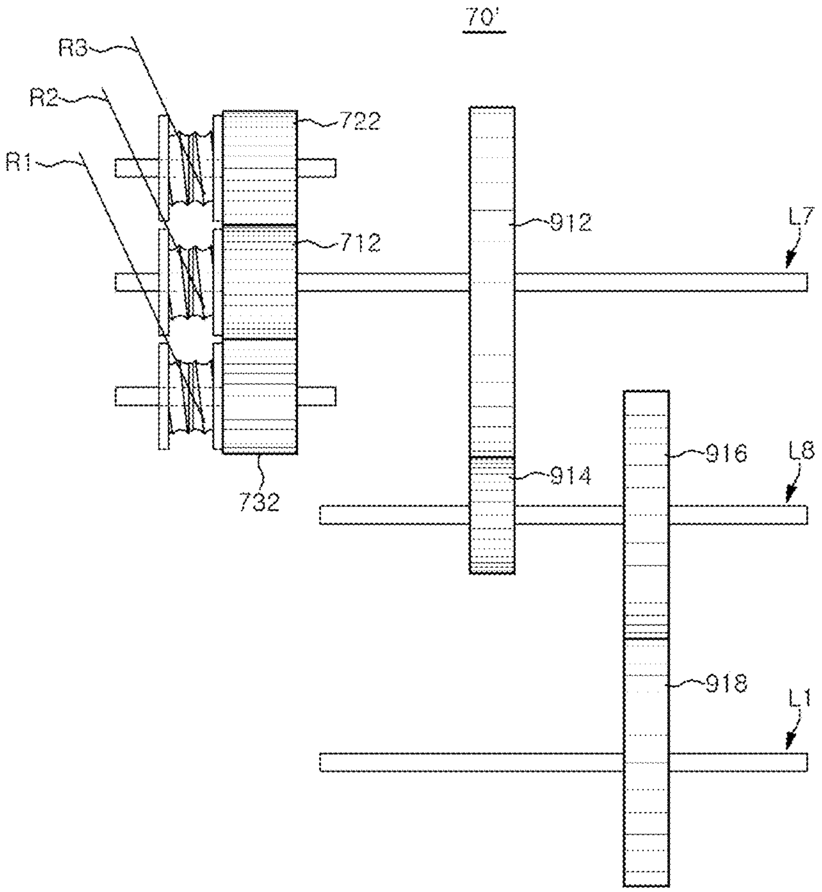

【FIG. 6】
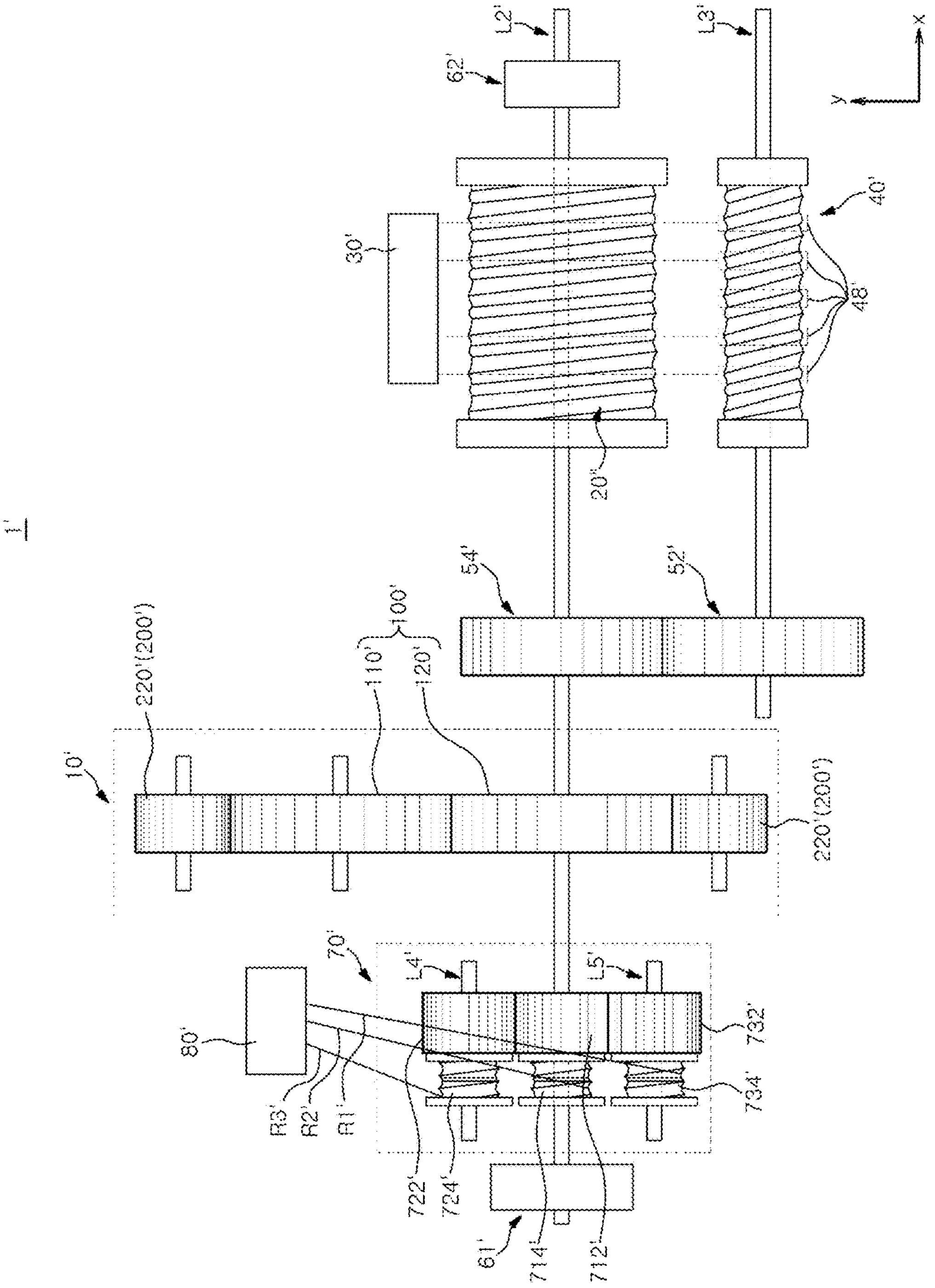

【FIG. 7】
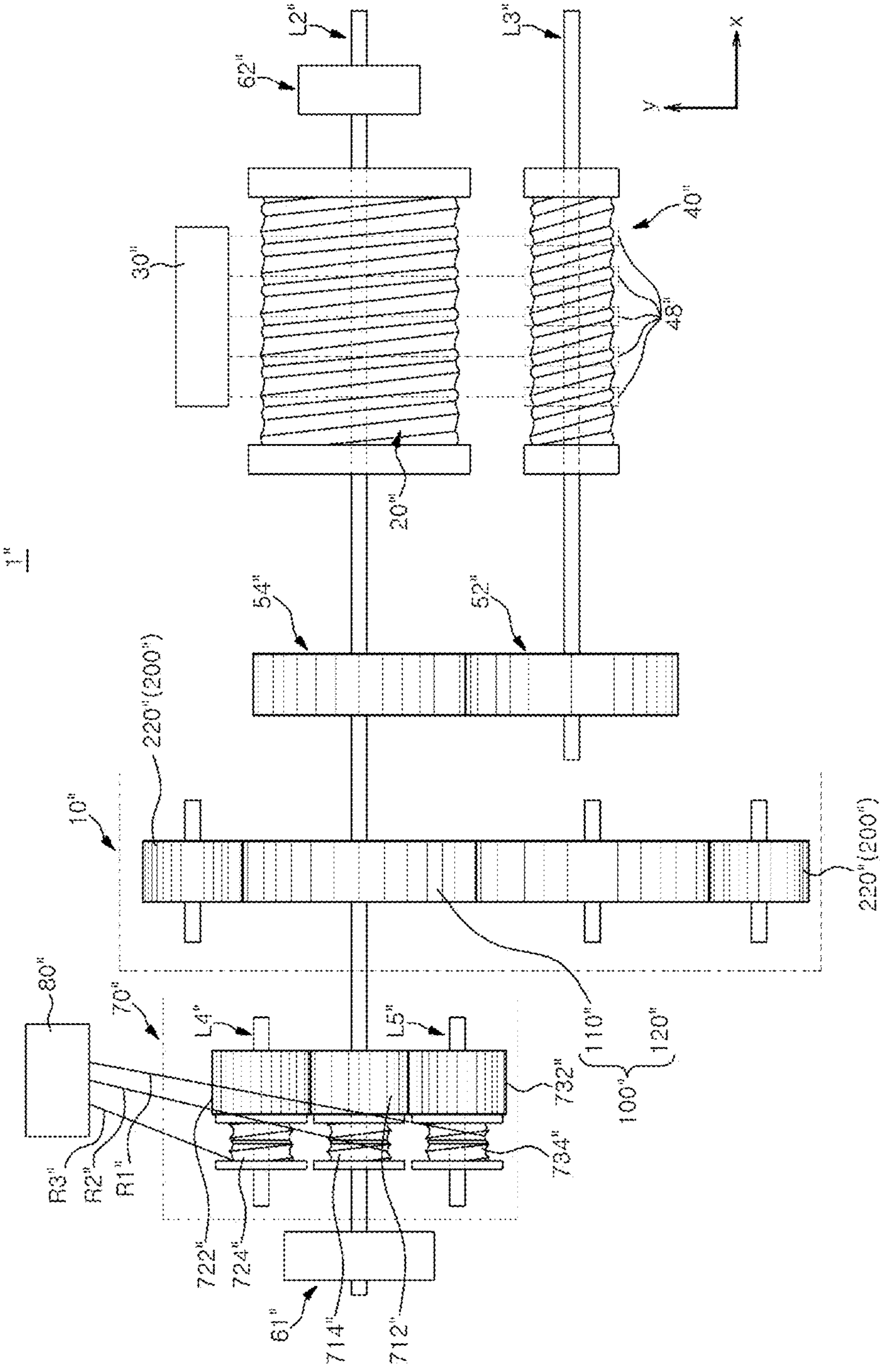

【FIG. 8】
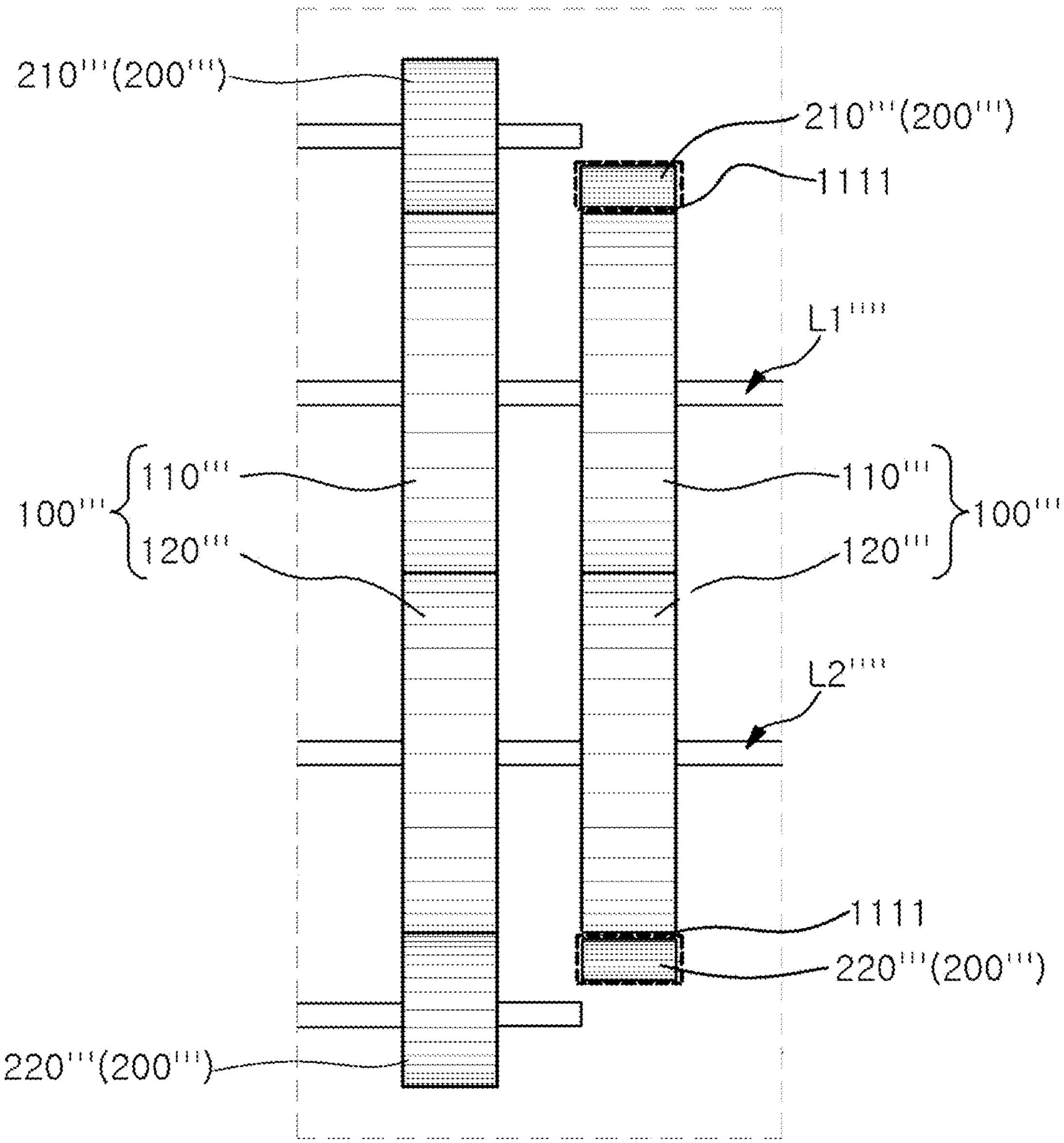

【FIG. 9】
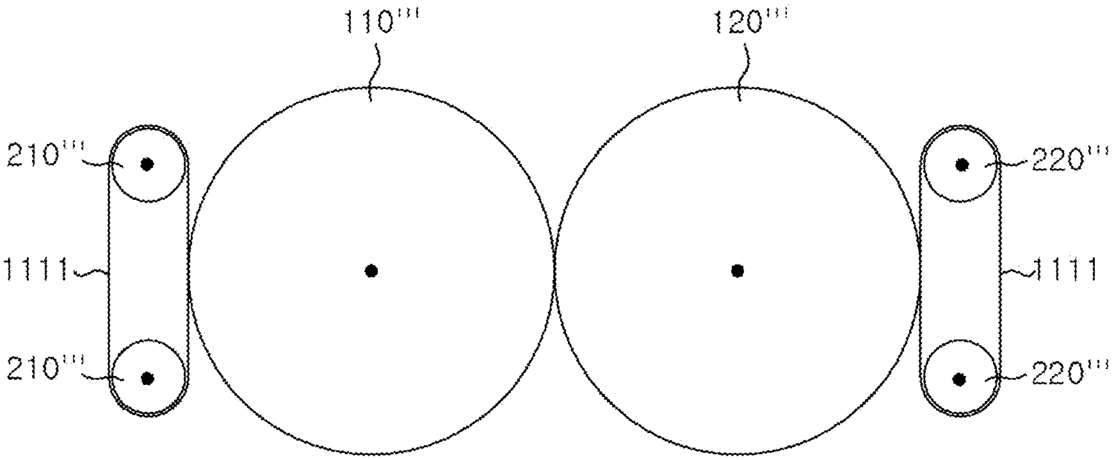

【FIG. 10】
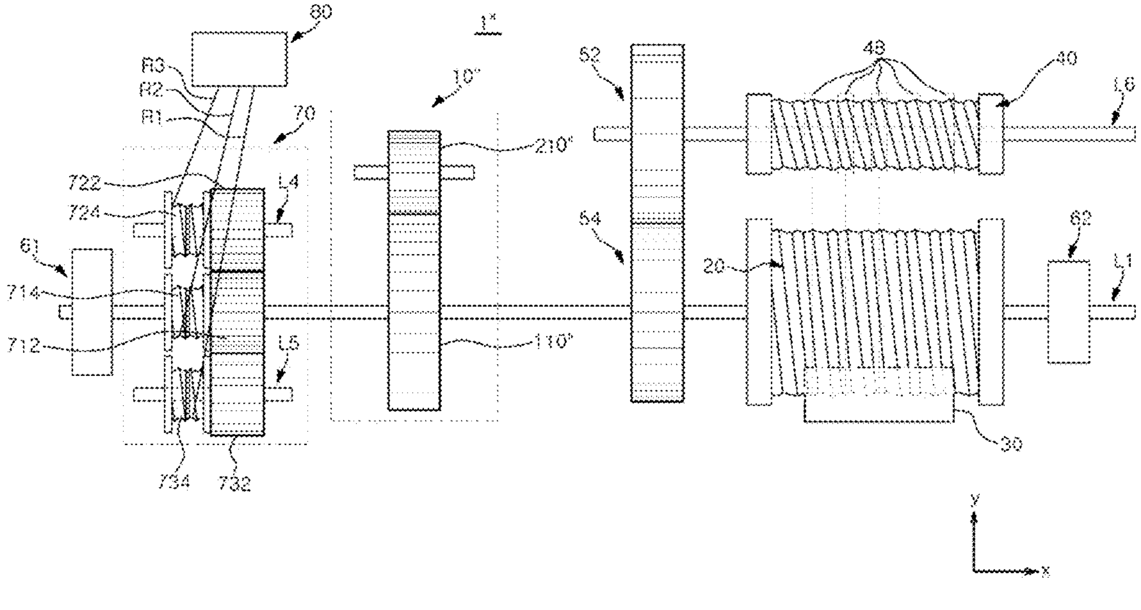

【FIG. 11】
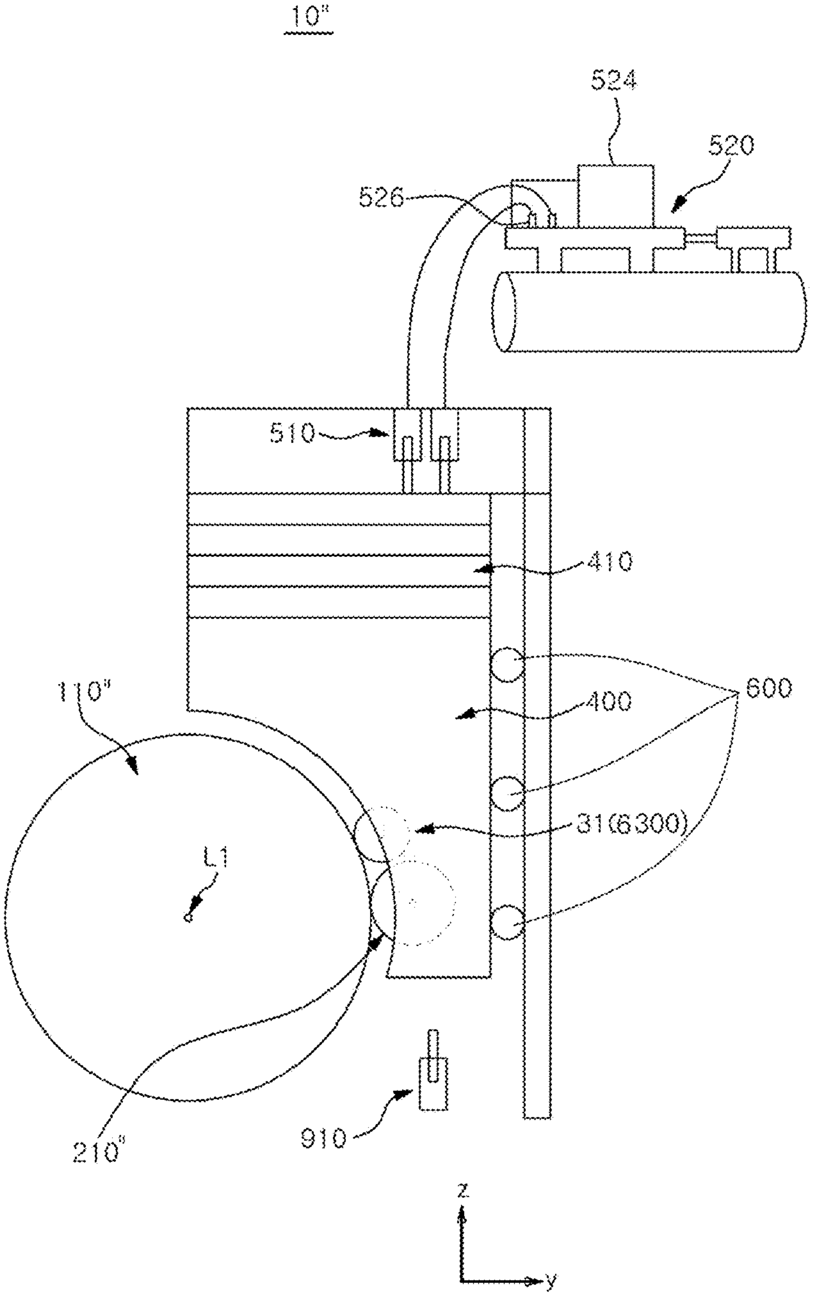

【FIG. 12】
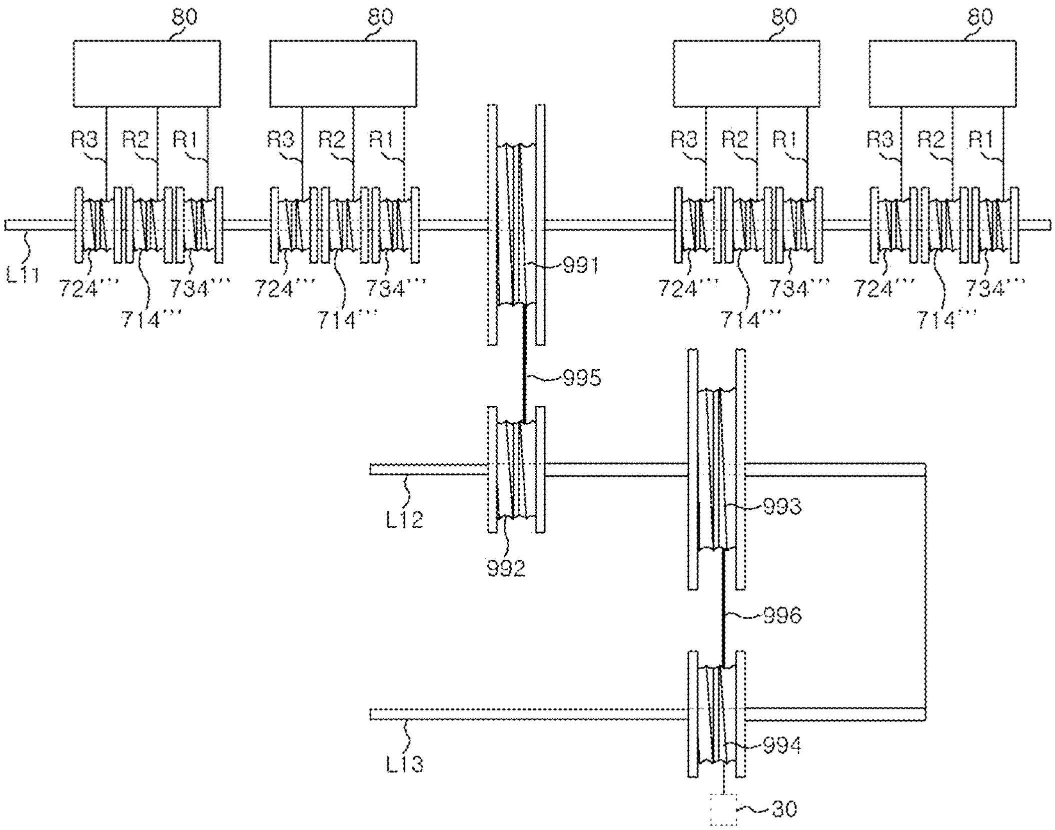
【FIG. 13】
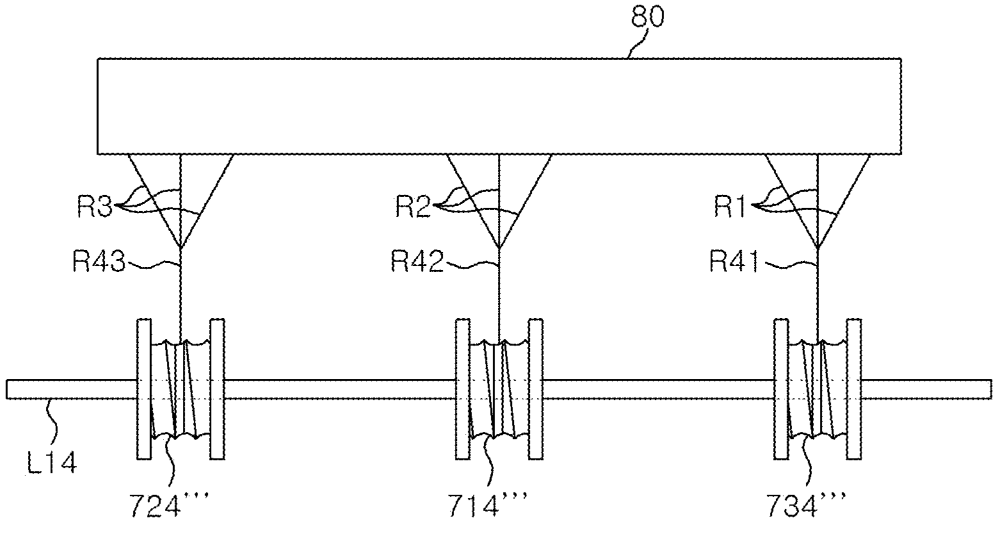

BALANCING APPARATUS AND BALANCING SYSTEM COMPRISING SAME

TECHNICAL FIELD

The present invention relates to a balancing apparatus and a balancing system including the same.

BACKGROUND

In general, elevators used in a building such as a residential building and a commercial building have a hoist way formed vertically inside the building, and an elevator car and a balancing weight travel up and down along the hoist way to move passengers or cargo.

Accordingly, a problem that a required area of the hoist way is occupied as much as a traveling distance of the elevator car and the balancing weight, and thus the exclusive area of the building is reduced, and the economic loss has been increased exponentially due to the enlargement of the building and the increase in construction costs, which has been a problem that poses a heavy burden on the building owner.

In order to solve these problems, the applicant's prior registered patents, Korean Patent No. 10-1817143 B1 and Korean Patent No. 10-1917222 B1, proposed an invention to shorten a traveling distance of a balancing weight by increasing a diameter of an elevator rope winding drum, and by reducing a diameter of a balancing weight rope winding drum, or by arranging a gear between the elevator rope winding drum and the balancing weight rope winding drum.

However, in this case, a problem that it is necessary to increase arises a load of the balancing weight arises.

Specifically, when a load of the elevator car is applied to the outside of the elevator rope winding drum with a large diameter and a load of the balancing weight is applied to the outside of the balancing weight rope winding drum balancing weight with a small diameter, a problem that the load of the balancing weight should be increased to offset this torque difference arises because a shaft to which the elevator rope winding drum is connected takes a greater torque than a shaft to which the balancing weight rope winding drum is connected.

DISCLOSURE

Technical Problem

Embodiments of the present invention are proposed to solve the above-mentioned problems and are directed to providing a balancing apparatus and a balancing system including the same capable of reducing a space by replacing the conventional balancing weight.

In addition, the embodiments of the present invention are directed to providing a balancing apparatus and a balancing system that capable of being used by replacing a balancing weight in all conventional devices in which the balancing weight is used.

Technical Solution

According to one aspect of the present invention, a balancing apparatus may include: an elevator winding drum connected to an elevator car; a center gear part connected to a first driving shaft of the elevator winding drum and including a first center gear; and an outer gear part including a first outer gear which contacts and rotates with the first center gear, and when the elevator winding drum receives force in a first direction by the elevator car, the center gear part applies a force with respect to the elevator winding drum in an opposite direction of the first direction by a force applied from the outer gear part.

In addition, the balancing apparatus may be provided in which the center gear part includes the first center gear and a second center gear rotating in contact with each other, and the first center gear is connected to the first driving shaft, wherein the outer gear part includes the first outer gear engaged with the first center gear; and a second outer gear engaged with the second center gear, the first center gear and the second center gear are fixed in the vertical direction (the gravity direction), and the first outer gear and the second outer gear are provided so as to be movable in the vertical direction (the gravity direction).

In addition, the balancing apparatus may further include: a moving part which is relatively movable with respect to the center gear part in a state in which the moving part is connected to the outer gear part; and a balancing weight disposed at one side of the moving part; and a load control part capable of applying a force to the moving part.

In addition, the balancing apparatus may further include an auxiliary gear disposed at an upper side of the outer gear part and engaged with the center gear part.

According to one aspect of the present invention, the balancing system may further include: the balancing apparatus according to Claim 1; a power connection part connected to the first driving shaft; and an auxiliary balancing device capable of applying a force to the first driving shaft through the power connection part.

In addition, the balancing system may be provided in which the auxiliary balancing device includes a plurality of connection ropes connected to the power connection part and a balancing bar fixing the connection rope at one side and provided with a moving weight at the other side thereof, and a force applied from the balancing bar to the power connection part varies according to the position of the moving weight.

In addition, the balancing system may be provided in which the plurality of connection ropes are connected to the balancing bar through a roller disposed on an upper side of the balancing bar and a roller disposed at a lower side of the balancing bar.

In addition, the balancing system may be provided in which the auxiliary balancing device and the power connection part are connected through a first connection rope, a second connection rope, and a third connection rope, the first connection rope applies a force to rotate a first gear of the power connection part, the second connection rope applies a force to rotate a third gear of the power connection part, the third connection rope applies a force to rotate a second gear of the power connection part, when the third gear rotates clockwise, the second gear and the first gear rotate counterclockwise, and, when a force is generated by the balancing bar to raise the third connection rope, the third connection rope rotates the second gear counterclockwise, and as the second gear rotates counterclockwise, the third gear rotates clockwise to pull the second connection rope and simultaneously rotates the first driving shaft to offset the force applied from elevator car.

In addition, the balancing system may include: a plurality of first center gears disposed in parallel and spaced apart from each other; a plurality of second center gears disposed in parallel and spaced apart from each other; the first outer gear directly connected to one first center gear and the second outer gear directly connected to one second center gear; and the first outer gear indirectly connected to the other first center gear and the second outer gear indirectly connected to the other second center gear.

In addition, the balancing system may be provided in which the force applied to the power connection part varies according to a distance X1 between a first fixing part and the moving weight which are disposed on the balancing bar and a distance X2 between the first fixing part and a second fixing part which are disposed on the balancing bar.

Advantageous Effects

A balancing apparatus and a balancing system including the same according to embodiments of the present invention have an advantage of reducing a space by replacing the conventional balancing weight.

In addition, there is an advantage of being able to be used by replacing a balancing weight in all conventional devices in which the balancing weight is used.

In addition, a torque applied to a rotating shaft of a power generator and an industrial machine can be offset.

In addition, a ratio of a traveling distance can be arbitrarily adjusted by the balancing weight according to a traveling distance of an elevator.

DESCRIPTION OF DRAWINGS

FIG. 1 is a view conceptually illustrating a balancing system 1 according to one embodiment of the present invention.

FIG. 2 is a view conceptually illustrating a side view of the balancing apparatus 10 of FIG. 1.

FIG. 3 is a view conceptually illustrating a side view of an auxiliary balancing device 80 of FIG. 1.

FIG. 4 is a view conceptually illustrating a front view of a third gear 712, a second gear 722, and a first gear 732 of FIG. 1.

FIG. 5 is a view illustrating an embodiment in which a roping distance of a balancing weight is shortened.

FIG. 6 is a view illustrating a balancing system 1' according to another embodiment of the present invention.

FIG. 7 is a view illustrating a balancing system 1" according to still another embodiment of the present invention.

FIG. 8 is a view illustrating a balancing apparatus according to still another embodiment of the present invention.

FIG. 9 is a view conceptually illustrating a side surface of a first outer gear 210''' indirectly connected to a first center gear 110''' and a second outer gear 220''' indirectly connected to a second center gear 120''' in the balancing apparatus of FIG. 8.

FIG. 10 is a view schematically illustrating a balancing system 1" according to yet another embodiment of the present invention.

FIG. 11 is a view conceptually illustrating a side view of the balancing apparatus 10" illustrated in FIG. 10.

FIG. 12 is a view illustrating a modified example of FIG. 5.

FIG. 13 is a view illustrating an embodiment in which a plurality of first connection ropes R1, third connection ropes R3, and second connection ropes R2 are connected to a first winding drum, a second winding drum, and a third winding drum of FIG. 12, respectively.

MODES OF THE EMBODIMENT

Hereinafter, specific embodiments of the present invention will be described in detail with reference to the drawings. In addition, in describing the present invention, when it is determined that a detailed description of a related known configuration or function may obscure the gist of the present invention, the detailed description will be omitted.

FIG. 1 is a view conceptually illustrating a balancing system 1 according to one embodiment of the present invention, FIG. 2 is a view conceptually illustrating a front view of a balancing apparatus 10 of FIG. 1, FIG. 3 is a view conceptually illustrating a side view of an auxiliary balancing device 80 of FIG. 1, and FIG. 4 is a view conceptually illustrating a front view of a third gear 712, a second gear 722, and a first gear 732 of FIG. 1.

FIGS. 1 to 4 may be understood as conceptual representations for convenience of description.

In addition, FIG. 1 is a view conceptually illustrating the balancing system 1 viewed from top to bottom, and FIGS. 2 and 3 are views schematically illustrating the balancing apparatus 10 and the auxiliary balancing device 80 viewed from the side, respectively.

Referring to FIGS. 1 to 4, the balancing system 1 according to one embodiment of the present invention may include an elevator car 30, an elevator winding drum 20 connected to an elevator car 30, and a balancing apparatus 10 which operates in conjunction with an elevator winding drum 20.

The conventional balancing weight may be replaced by the balancing apparatus 10 of the embodiment, and a space in which the balancing weight moves may be eliminated, thereby realizing space saving.

For example, when the elevator winding drum 20 receives a force in a first direction due to a weight of the elevator car 30, the balancing apparatus 10 may apply with respect to the elevator winding drum 20 in an opposite direction to the first direction.

Specifically, the balancing apparatus 10 may include the elevator winding drum 20 connected to the elevator car 30; a pair of center gear part 100 connected to a first driving shaft L1 of the elevator winding drum 20 and rotating in contact with each other, and a pair of outer gear parts 200 each rotating in contact with the pair of center gear part 100.

In this case, when the elevator winding drum 20 receives the force in the first direction by the elevator car 30, the center gear part 100 may apply force with respect to the elevator winding drum 20 in the opposite direction to the first direction by the force applied from the outer gear part 200.

In the embodiment illustrated in FIG. 1, the elevator winding drum 20 receives the force from the elevator car 30 clockwise (when viewed from left to right in FIG. 1), and thus the first direction may be understood as clockwise.

However, the spirit of the present invention is not limited thereto, and the direction of the first direction may change according to the relative positions of the elevator car 30 and the elevator winding drum 20.

The elevator car 30 may be disposed on a lower portion between two elevator winding drums 20, 20'. However, a position at which the elevator car 30 is disposed is not limited thereto.

The elevator winding drum 20 and the center gear part 100 may be connected through the first driving shaft L1. That is, the center gear part 100 and the elevator winding drum 20 are relatively fixed through the first driving shaft L1, and thus, when the center gear part 100 receives the force from the outer gear part 200, the same force may be applied to the elevator winding drum 20.

The pair of center gear part 100 may include a first center gear 110 connected to the first driving shaft L1, and a second center gear 120 engaged with the first center gear 110.

In addition, the pair of outer gear part 200 may include a first outer gear 210 engaged with the first center gear 110, and a second outer gear 220 engaged with the second center gear 120.

In addition, the first center gear 110 and the second center gear 120 may be fixed in the vertical direction, and the first outer gear 210 and the second outer gear 220 may be provided to be movable in the vertical direction.

The pair of outer gear parts 200 may act as a lever principle with respect to the pair of center gear part 100. For example, when a load is applied downward to the moving part 400, as the first outer gear 210 presses the center gear part 100 downward, the first outer gear 210 may rotate clockwise and the first center gear 110 may rotate counter-clockwise.

In addition, the force applied to the center gear part 100 by the outer gear part 200 may vary according to relative positions of the outer gear part 200 and the center gear part 100.

The center gear part 100 and the outer gear part 200 may be formed of a material such as resin rubber, alloy, or the like. However, the spirit of the present invention is not limited thereto and may include the outer gear part 200 being formed of various materials.

Here, the vertical direction is the gravity direction and may be understood as a z-axis direction based on FIG. 2.

The outer gear part 200 may apply a force in a downward direction (−z direction) with respect to the center gear part 100.

Specifically, the balancing apparatus 10 may further include a moving part 400 relatively movable with the center gear part 100 in a state being connected with the outer gear part 200 and a load control part 510 capable of applying a load to the moving part 400 (the moving part 400 is excluded in FIG. 1 for convenience of description).

The load control part 510 may be fixed at an upper side of a support part 700, and the moving part 400 may vertically move relative to the support part 700 through a roller 600.

Here, the load control part 510 is a piston cylinder and may use hydraulic pressure, air pressure, or spring tension. The load control part 510 may be applied with a force through the power part 520.

That is, when pressure is applied to the power part 520, the load control part 510 may press the balancing weight 410 and the moving part 400 connected thereto in the downward direction.

Accordingly, the outer gear part 200 connected to the moving part 400 may offset a force applied to the elevator winding drum 20 from the elevator car 30 by applying the force to the center gear part 100.

For example, as the elevator car 30 becomes heavier, the force applied to the elevator winding drum 20 may be offset by applying more pressure to the load control part 510 from the load control part 510 or by increasing a load of the balancing weight 410 itself.

The balancing apparatus 10 of the present embodiment may be used in various other devices as well as a device for balancing the elevator car 30.

A power control box 524 may be disposed at one side of the power part 520.

The power control box 524 may include a sensor capable of detecting a weight applied to the balancing weight 410 and may automatically offset a relative weight applied to the balancing weight 410 by using air pressure.

In addition, a control valve 526 may be disposed at one side of the power part 520, the control valve 526 may adjust hydraulic or air pressure applied from the power part 520 to the load control part 510, and the load applied to the balancing weight 410 may be automatically controlled by adjusting the hydraulic or air pressure applied to the load control part 510.

In addition, the balancing apparatus 10 may include an auxiliary gear 300 engaged with the center gear part 100.

The auxiliary gear 300 may be spaced apart from the outer gear part 200 and disposed to engage with the center gear part 100.

For example, the auxiliary gear 300 may include a first auxiliary gear 310 engaged with the first center gear 110 but spaced apart from the first outer gear 210 and a second auxiliary gear 320 engaged with the second center gear 120 but spaced apart from the second outer gear 220.

Here, a large diameter may be provided to be larger in the order of the center gear part 100, the outer gear part 200, and the auxiliary gear 300.

The first auxiliary gear 310 may be disposed at an upper side of the first outer gear 210, and the second auxiliary gear 320 may be disposed at an upper side of the second outer gear 220 (see FIG. 2).

In addition, the balancing system 1 of the present embodiment may include a plurality of elevator winding drums 20.

For example, one elevator winding drum 20 may be disposed on the first driving shaft L1 connected to the first center gear 110, and the other elevator winding drum 20' may be disposed on the second driving shaft L2 connected to the second center gear 120.

In the embodiment, the second driving shaft L2 may be rotated clockwise or counterclockwise as necessary.

In addition, the balancing system 1 of the present embodiment may include a deceleration motor 61 capable of decelerating the first driving shaft L1, a first break 62 capable of stopping the first driving shaft L1, and a second break 64 capable of stopping the second driving shaft L2.

The first break 62 and the second break 64 may operate automatically depending on the sensor. For example, the sensor may be disposed on at least one of the balancing apparatus 10, the elevator car 30, and the elevator winding drum 20, and when a situation (emergency situation) in which operation should be stopped is detected by the sensor, the first break 62 and the second break 64 may operate to stop the first driving shaft L1 and the second driving shaft L2.

In addition, the balancing system 1 may include a wire guiding device 40, and the wire guiding device 40 may be connected to a third driving shaft L3.

In this case, the first connection gear 52 may be disposed on the third driving shaft L3, the second connection gear 54 may be disposed on the second driving shaft L2, and the first connection gear 52 and the second connection gear 54 may be engaged with each other.

The connection between the first connection gear 52 and the second connection gear 54 may include connection by a chain belt, as well as gears.

A wire wound around the elevator winding drum 20 may be wound and unwound smoothly by the wire guiding device 40.

A rope guiding part 48 may be disposed at one side of the wire guiding device 40. In the present embodiment, the rope guiding part 48 is described being placed at an upper side of the wire guiding device 40 as an example, but a position at which the rope guiding part 48 is disposed is not limited thereto.

The rope guiding part 48 may move parallel (along the X-axis direction) with the third driving shaft L3.

By disposing the rope guiding part 48, as the elevator winding drum 20' rotates, the wire wound around thereto may be smoothly wound and unwound.

Similarly, the first connection gear 52 may be disposed on a sixth driving shaft L6, the second connection gear 54 may be disposed on the first driving shaft L1, and the first connection gear 52 and the second connection gear 54 may be engaged with each other.

The wire guiding device 40 may be disposed on the sixth driving shaft L6, and the rope guiding part 48 may be disposed at one side of the wire guiding device 40. As such, by disposing the rope guiding part 48 at one side of the wire guiding device 40, as the elevator winding drum 20' rotates, the wire wound around the elevator winding drum 20' may be smoothly wound and unwound.

Here, the first driving shaft L1, the second driving shaft L2, the third driving shaft L3, and the sixth driving shaft L6 may be disposed parallel to each other.

On both sides of first driving shaft L1, second driving shaft L2, third driving shaft L3, fourth driving shaft L4, fifth driving shaft L5, and sixth driving shaft L6 described above, a support member is formed to rotatably support the corresponding driving shaft. Similarly, on both sides of the driving shaft to be described later, a support member is formed to rotatably support the corresponding driving shaft. Such a support member may be understood by known technologies.

Hereinafter, the force applied from the balancing apparatus 10 to the elevator winding drum 20 is describe in more detail.

When the moving part 400 is moved down by the load control part 510 connected to the balancing weight 410 or the power part 520, the outer gear part 200 and the auxiliary gear 300 may rotate the center gear part 100.

Specifically, the first center gear 110 may rotate counterclockwise, and the second center gear 120 may rotate clockwise (see FIG. 2). Accordingly, the first driving shaft L1 connected to the first center gear 110 may also rotate counterclockwise, thereby rotating the elevator winding drum 20 counterclockwise.

In addition, the outer gear part 200 and the auxiliary gear 300 may maintain the force applied from the elevator car 30 by pressing the center gear part 100 downward.

In addition, a first buffer device 910 may be disposed at a lower end of the moving part 400. The first buffer device 910 may prevent the moving part 400 from colliding with the ground.

The moving part 400 may be provided in metal to apply a load to the outer gear part 200 and the auxiliary gear 300.

In addition, the balancing system 1 may further include an auxiliary balancing device 80 which operates in conjunction with the elevator winding drum 20, and the auxiliary balancing device 80 may be provided optionally.

Specifically, the balancing system 1 may further include a power connection part 70 connected to the first driving shaft L1 and the auxiliary balancing device 80 capable of applying a force to the first driving shaft L1 through the power connection part 70.

Here, the power connection parts 70 and the auxiliary balance device 80 may be provided in plural.

Referring to FIG. 3., the auxiliary balancing device 80 is described in more detail as follows.

The auxiliary balancing device 80 may include a plurality of connection ropes connected to the power connection part 70 and a balancing bar 810 having a connection rope fixed on one side and a moving weight 819 provided on the other side thereof.

In addition, the connection rope may be connected to the balancing bar 810 through a first roller 832 and a second roller 834 which are located at an upper side of the balancing bar 810.

In this case, a force applied from the balancing bar 810 to the power connection part 70 may vary according to the position of the moving weight 819.

As the first driving shaft L1 rotates, the connection rope may be wound or unwound, and accordingly, the balancing bar 810 may vertically move.

The first roller 832 and the second roller 834 may be fixed to the fixing part and may move the plurality of connection ropes by rotation.

Here, the fixing part may include an upper fixing part 822 in which a first roller 832 and a second roller 834 are disposed, a side fixing part 824 in which a guide is installed so that the balancing bar 810 may vertically, and a lower fixing part 826 in which a buffer device 920 is disposed.

In addition, the buffer device 920 may be disposed at a lower side of the balancing bar 810. The buffer device 920 may prevent the balancing bar 810 and the lower fixing part 826 from being in contact with each other.

Here, a support member to support the lower fixing part 826 may be formed on both sides of the lower fixing part 826, and the support member may be understood by a known technology.

Through the auxiliary balancing device 80, the force may be applied to the power connection part 70, and the power connection part 70 may apply a force to rotate the elevator winding drum 20 through the first driving shaft L1.

In addition, the force applied from the auxiliary balancing device 80 to the elevator winding drum 20 may vary according to the position where the moving weight 819 is disposed on the balancing bar 810.

For example, the greater a distance between the first fixing part 812 and the moving weight 819 disposed on the balancing bar 810 becomes (the longer X1), the greater the force applied by the auxiliary balancing device 80 to the elevator winding drum 20 may become. Similarly, the closer the length of the first fixing part 812 and the moving weight 819 disposed on the balancing bar 810 becomes, the smaller the force applied by the auxiliary balancing device 80 to the elevator winding drum 20 may become.

In addition, the first fixing part 812 may be provided to move from the balancing bar 810, and in this case, the force applied to the elevator winding drum 20 may vary as a distance between the second fixing part 814 and the first fixing part 812 changes.

In addition, the force applied to the power connection part 70 may vary according to the distance X1 between the first fixing part 812 and the moving weight 819 which are disposed on the balancing bar 810 and the distance X2 between the first fixing part 812 and the second fixing part 814 disposed on the balancing bar 810.

Here, the first fixing part 812 is provided movably so that a ratio of the distance X1 between the first fixing part 812 and the moving weight 819 and the distance X2 between the first fixing part 812 and the second fixing part 814 may be adjusted.

The auxiliary balancing device 80 may serve a conventional balancing weight by adjusting the moving weight 819 according to the weight of the elevator car 30.

A third roller 852 is formed on a side surface of the balancing bar 810 of the auxiliary balancing device 80, and the third roller 852 may be provided to move along the side fixing part 824. Accordingly, the balancing bar 810 may move in the vertical direction (the z-axis direction) along the side fixing part 824.

In addition, the moving weight 819 disposed on the balancing bar 810 may move in a horizontal direction (a y-axis direction).

In addition, the weight (e.g., the weight of the elevator car 30, a weight applied to the first connection rope R1, the second connection rope R2, the third connection rope R3, etc.) may be detected by the sensor and the moving weight 819 may automatically move left and right.

In addition, a fourth roller 854 may be disposed on the balancing bar 810 which is spaced apart from the moving weight 819 to one side.

The fourth roller 854 may be disposed on the balancing bar 810 spaced apart from the moving weight 819 to the other side, and a moving weight movement line 862 may connect the moving weight 819 and the fourth roller 854 disposed on both sides of the moving weight 819.

A control box 864 may rotate at least one of a plurality of fourth rollers 854 to move left and right the moving weight 819 on the balancing bar 810.

In addition, the auxiliary balancing device 80 may be installed with the control box 864 fixed to one side surface of the side fixing part 824 and controlling the rotation of the fourth roller 854.

In addition, the first fixing part 812 disposed on the balancing bar 810 may also move from the balancing bar 810 to another position. Accordingly, the distance of X1 and X2 may be adjusted.

In addition, the auxiliary balancing device 80 may include the plurality of connection ropes connected to the power connection part 70. Here, the connection ropes may be provided as a winding rope or a chain.

Specifically, The connection ropes may include the first connection rope R1 which connects the balancing bar 810 and a first winding drum 734 of the power connection part 70, the second connection rope R2 which connects the balancing bar 810 and a third winding drum 714 of the power connection part 70, and the third connection rope R3 which connects the balancing bar 810 and a second winding drum 724 of the power connection part 70.

Here, the third connection rope R3 may be connected to the second fixing part 814, the second connection rope R2 may be connected to a third fixing part 816, and the first connection rope R1 may be connected to the first fixing part 812.

Here, the second fixing part 814 and the third fixing part 816 may be disposed to face each other on the balancing bar 810, and the first fixing part 812 may be disposed between the second fixing part 814 and the moving weight 819.

The power connection part 70 may include the second winding drum 724 connected to the third connection rope R3, the third winding drum 714 connected to the second connection rope R2, the first winding drum 734 connected to the first connection rope R1, the second gear 722 rotating integrally with the second winding drum 724, the third gear 712 rotating integrally with the third winding drum 714, and the first gear 732 disposed to be engaged with the second gear 722 and the first gear 732.

The third gear 712 may be fixed on the first driving shaft L1, and the first driving shaft L1 may be fixed on the third winding drum 714.

That is, the first driving shaft L1 may be rotated by the auxiliary balancing device 80 and may rotate the elevator winding drum 20 connected thereto.

However, the spirit of the present invention is not limited thereto, and a power generation device or the like may be installed on the first driving shaft L1 to generate power.

The above-described FIG. 4 may be understood as a structure in which a pressing force and a pulling force are configured as one force so as to generate a large force by maintaining the balance of the balancing bar 810.

In addition, the sensor may be attached on the elevator winding drum 20 and a rotation speed of the elevator winding drum 20 may be transmitted to a deceleration motor to maintain a constant rotation speed.

When there are many or few wires wound around the elevator winding drum 20, a speed of the elevator car 30 increases or decreases (e.g., when the elevator winding drum 20 becomes larger or smaller.)

In addition, a plurality of elevator winding drums 20 may be installed and connected in series or parallel.

The wire guiding device 40 may rotate the same as the rotation of the elevator winding drum 20 disposed on the first driving shaft L1 or the second driving shaft L2 may be linked by gears, chain belts, etc., and the elevator winding drum 20 may be smoothly wound and unwound by the wire guiding device 40.

A fifth roller 842, a sixth roller 844, and a seventh roller 846 may be disposed on the lower fixing part 826.

The first connection rope R1 may be connected to the power connection part 70 via the fifth roller 842, the second connection rope R2 may be connected to the power connection part 70 via the sixth roller 844, and the third connection rope R3 may be connected to the power connection part 70 via the seventh roller 846.

Hereinafter, the force applied to the elevator winding drum 20 by the auxiliary balancing device 80 is described in more detail.

The balancing bar 810 is forced downward by the moving weight 819, and the plurality of connection ropes fixed at the opposite side of the moving weight 819 may rotate the first winding drum 734, the second winding drum 724, and the third winding drum 714 of the power connection part 70.

Accordingly, the first gear 732 which rotates integrally with the first winding drum 734 may rotate, the second gear 722 which rotates integrally with the second winding drum 724 may rotate, and the third gear 712 which rotates integrally with the third winding drum 714 may rotate.

That is, the first gear 732 and the second gear 722 may be rotated counterclockwise by the first connection rope R1 and the third connection rope R3, and the third gear 712 may be rotated clockwise by the second connection rope R2. However, the rotation direction may vary according to a winding direction of the first connection rope R1, the second connection rope R2, and the third connection rope R3 and may include the rotation of the first gear 732 and the second gear 722 clockwise and the rotation of the third gear 712 counterclockwise.

In the present embodiment, it is described as an example that the first connection rope R1, the second connection rope R2, and the third connection rope R3 are one, but the first connection rope R1, the second connection rope R2, and the third connection rope R3 may two or more.

In addition, a plurality of power connection part 70 and a plurality of auxiliary balance device 80 may be installed.

FIG. 5 is a view illustrating an embodiment in which the roping distance of the balancing weight is shortened. Here, FIG. 5 may be understood as another embodiment of the power connection part.

The number of rotations of the first driving shaft L1 connected with the elevator winding drum 20 by a power connection part 70' illustrated in FIG. 5 may be increased. Accordingly, even when the first connection rope R1 to the third connection rope R3 move a short distance, the number of rotations of the elevator winding drum 20 may be increased.

Specifically, the power connection part 70' may include the third gear 712 connected to the seventh driving shaft L7, the second gear 722 and the first gear 732 disposed on both sides of the third gear 712, the fourth gear 912 connected to the seventh driving shaft L7, the eighth driving shaft L8 disposed parallel to the seventh driving shaft L7, the fifth gear 914 connected to the eighth driving shaft L8 and formed with a diameter smaller than that of the fourth gear 912, the sixth gear 916 connected to the eighth driving shaft L8 and formed with a diameter larger than that of the fifth gear 914, the first driving shaft L1 disposed parallel to the eighth driving shaft L8, and the seventh gear 918 disposed on the first driving shaft L1, engaged with the sixth gear 916, and formed with a diameter smaller than that of the sixth gear 916.

In this case, the first driving shaft L1 may be connected with the elevator winding drum 20.

That is, the number of rotations of the first driving shaft L1 to which the elevator winding drum 20 is connected may be controlled more than that of the seventh driving shaft L7 to which the third gear 712 is connected by a gear ratio of the fourth gear 912, the fifth gear 914, the sixth gear 916, and the seventh gear 918.

FIG. 6 is a view illustrating a balancing system 1' according to another embodiment of the present invention.

The embodiment has a major difference compared to the above-described embodiment in that one elevator winding drum 20" is provided, and thus the major difference is described and, the same matters, are cited by the description and the drawing symbols described above.

The power connection part 70 and the auxiliary balancing device 80 of the above-described embodiment are the same as the power connection part 70' and the auxiliary balancing device 80' of the present embodiment, respectively, and the description thereof is replaced with the above-described description.

The balancing system 1' according to another embodiment of the present invention may include an elevator winding drum 20" to which an elevator car 30' is connected, a pair of center gear part 100' connected to a first driving shaft L1' of the elevator winding drum 20" and rotating in contact with each other; and a pair of outer gear part 200' contacting and rotating with the pair of center gear part 100', respectively, and when the elevator winding drum 20" receives a force in the first direction by the elevator car 30', the center gear part 100' may apply a force with respect to the elevator winding drum 20" in the opposite direction of the first direction by the force applied from the outer gear part 200'.

In the above-described embodiment, the first driving shaft L1 was connected to the first center gear 110, but in the present embodiment, the first driving shaft L1' is connected to the second center gear 120'.

In addition, in the above-described embodiment, the third gear 712 and the first center gear 110 were connected to the first driving shaft L1, but in the present embodiment, the third gear 712' and the second center gear 120' are connected to the first driving shaft L1'.

FIG. 7 is a view illustrating a balancing system 1" according to still another embodiment of the present invention.

The present embodiment has a major difference compared to the above-described embodiments in FIGS. 1 to 5 in that one elevator winding drum 20'" is provided, and thus the major difference is described and, the same matters, are cited by the description and the drawing symbols described above.

The power connection part 70 and the auxiliary balancing device 80 of the above-described embodiment are the same as the power connection part 70" and the auxiliary balancing device 80" of the present embodiment, respectively, and the description thereof is replaced with the above-described description.

A balancing system 1" according to another embodiment of the present invention may include an elevator winding drum 20'" to which an elevator car 30" is connected, a pair of center gear part 100" connected to the first driving shaft L1" of the elevator winding drum 20" and rotating in contact with each other, and a pair of outer gear parts 200" rotating in contact with the pair of center gear part 100", respectively, and when the outer gear parts 200" receive a force in the first direction by the elevator car 30", the center gear part 100" may apply a force with respect to the elevator winding drum 20'" in the opposite direction of the first direction by the force applied from the outer gear part 200".

In the embodiments described in FIGS. 1 to 5, the second center gear 120 was connected to the second driving shaft L2, but in the present embodiment, the second driving shaft L2 is excluded.

FIGS. 6 and 7 are views allowing easy selection of shaft rotation. A rotation ratio is not limited and may be reduced or increased.

FIG. 8 is a view drawing schematically illustrating a balancing apparatus according to still another embodiment of the present invention, and FIG. 9 is a view conceptually illustrating a side surface of a first outer gear 210'" indirectly connected to a first center gear 110'" and a second outer gear 220'" indirectly connected to a second center gear 120'" in the balancing apparatus of FIG. 8.

Compared to the embodiments described above in FIGS. 1 to 5, as illustrated in FIGS. 8 and 9, there is a major difference in that the center gear part and the outer gear part are installed in a composite manner and the type of gear may be configured as a spur gear or a chain gear, and thus the major difference is described, and the same matters are cited by the description and the drawing symbols described above.

Referring to FIGS. 8 and 9, the balancing apparatus according to still another embodiment of the present invention may include a plurality of first center gears 110'" disposed in parallel and spaced apart from each other, a plurality of second center gears 120'" disposed in parallel and spaced apart from each other, a first outer gear 210'" directly connected to one first center gear 110'" and a second outer gear 220'" directly connected to one second center gear 120'", and a first outer gear 210'" indirectly connected to the other first center gear 110'" and a second outer gear 220'" indirectly connected to the other second center gear 120'".

For example, the first outer gear 210'" directly connected to the one first center gear 110'" and the second outer gear 220'" directly connected to the one second center gear 120'" may be directly engage as the spur gears, and the first outer gear 210'" indirectly connected to the other first center gear 110'", and the second outer gear 220'" indirectly connected to the other second center gear 120'", may be indirectly engaged as the chain gear.

The first outer gear 210'" directly connected to the one first center gear 110'" and the second outer gear 220'"

directly connected to the one second center gear 120''' are the same as the description described above in FIGS. 1 to 5, and thus the description is replaced with the description described above.

Hereinafter, with reference to FIG. 9, the first outer gear 210''' indirectly connected to the other first center gear 110''' and the second outer gear 220''' indirectly connected to the other second center gear 120''' are described in more detail.

The first center gear 110''' and the first outer gear 210''' may be indirectly connected.

For example, the first center gear 110''' and the first outer gear 210''' are spaced from each other, and the first center gear 110''' and the first outer gear 210''' may be connected through an indirect connection means 1111.

Here, the indirect connection means may be a chain or a line. However, the indirect connection means is not limited thereto as long as being capable of connecting the first center gear 110''' and the first outer gear 210''' to transmit a rotational power.

More specifically, one side surface of the first center gear 110''' may be provided with a pair of first outer gears 210''' spaced apart from the first center gear 110''', and the pair of first outer gears 210''' may be connected by the indirect connection means (e.g., a chain), and the indirect connection means may be in contact with the first center gear 110'''.

Similarly, one side surface of the second center gear 120''' may be provided with a pair of second outer gears 220''' spaced apart from the second center gear 120''', and the pair of second outer gears 220''' may be connected by the indirect connection means (e.g., a chain), and the indirect connection means may be in contact with the second center gear 120'''.

FIG. 10 is a view schematically illustrating a balancing system 1" according to yet another embodiment of the present invention.

FIG. 11 is a view conceptually illustrating a side view of the balancing apparatus 10" illustrated in FIG. 10.

The present embodiment has a major difference compared to the embodiments described above in FIGS. 1 to 5 in that the first center gear 110 and the first outer gear 210 are installed as one, and thus the major difference is described, and the same matters are cited by the description and the drawing symbols described above.

In the above-described embodiment of the present invention the pair of first center gears 100 and the pair of outer gear parts 200 are driven, but the spirit of the present invention is not limited thereto and one first center gear 110" and one second center gear 120" are driven in the embodiment.

That is, FIGS. 10 and 11 may include the elevator winding drum 20 connected to the elevator car 30, the center gear part 100 connected to a first driving shaft L1 of the elevator winding drum 20 and including the first center gear 110, and the outer gear part 200 including the first outer gear 210 rotating in contact with the first center gear 110, and, when the elevator winding drum 20 receives a force in the first direction by the elevator car 30, the center gear part 100 may apply a force with respect to the elevator winding drum 20 in the opposite direction of the first direction by the force applied from the outer gear part 200.

FIG. 12 is a view illustrating a modified example of FIG. 5.

Referring to FIG. 12, a plurality of auxiliary balancing device 80 and first winding drum 734''' to third winding drum 714''' corresponding to the same may be disposed, the first connection drum 991 and the second connection drum 992 may be connected by one of a wire, a chain, and a belt, and the third connection drum 993 and the fourth connection drum 994 may also be connected by one of a wire, a chain, and a belt.

Specifically, referring to FIG. 12, a plurality of winding drum sets and the first connection drum 991 may be connected to an eleventh driving shaft L11.

Here, the winding drum set may include the first winding drum 734''', a second winding drum 724''', and the third winding drum 714''' disposed in parallel.

For example, the eleventh driving shaft L11 may include a winding drum set connected to one auxiliary balancing device 80, another winding drum set connected to another auxiliary balancing device 80, still another winding drum set connected to still another auxiliary balancing device 80, and yet another winding drum set connected to yet another auxiliary balancing device 80, and the first connection drum 991 may be disposed between the winding drum sets.

The winding drum set may include the first winding drum 734''', the second winding drum 724''', and the third winding drum 714''', and each of the first winding drum 734''' may be connected to the first connection rope R1 extending from the auxiliary balancing device 80, the third winding drum 714''' may be connected to a second connection rope R2 extending from the auxiliary balancing device 80, and the second winding drum 724''' may be connected to a third connection rope R3 extending from the auxiliary balancing device 80.

The second connection drum 992 and the third connection drum 993 may be disposed in parallel on a twelfth driving shaft L12.

The first connection drum 991 disposed on the eleventh driving shaft L11 and the second connection drum 992 disposed on the twelfth driving shaft L12 may be connected by one of a wire, a chain, and a belt, and a drawing symbol 995 conceptually represents one of a wire, a chain, and a belt.

The third connection drum 993 to which the elevator car 30 is connected, may be disposed on a thirteenth driving shaft L13.

The third connection drum 993 disposed on the twelfth driving shaft L12 and the fourth connection drum 994 disposed on the thirteenth driving shaft L13 may also be connected by one of a wire, a chain, and a belt, and a drawing symbol 996 conceptually represents one of a wire, a chain, and a belt.

Here, the eleventh driving shaft L11, the twelfth driving shaft L12, and the thirteenth driving shaft L13 may be disposed in parallel.

In addition, the eleventh driving shaft L11 may correspond to the seventh driving shaft L7 in FIG. 5, the twelfth driving shaft L12 may correspond to the eighth driving shaft L8 in FIG. 5, and the thirteenth driving shaft L13 may correspond to the ninth driving shaft L9 in FIG. 5.

In addition, a guide roller capable of guiding the first connection rope R1, the second connection rope R2, and the third connection rope R3 may be installed in the auxiliary balancing device 80, and the first connection rope R1 to the third connection rope R3 may be easily connected to the first winding drum 734''' to the third winding drum 714''' by the guide roller.

Similarly, a wire guiding part and a wind may be installed on the first winding drum 734''' to third winding drum 714''', respectively, so that the connection rope is easily wound or unwound. Here, the guide roller, the wire guiding part, and the wind may be understood by known technologies.

FIG. 13 is a view illustrating an embodiment in which a plurality of first connection ropes R1, third connection ropes R3, and second connection ropes R2 are connected to the first winding drum 734''', the second winding drum 724''', and the third winding drum 714''' in FIG. 12, respectively.

Referring to FIG. 13, the plurality of first connection ropes R1 (e.g., three) may be provided from the auxiliary balancing device 80, and the plurality of first connection ropes R1 may be formed into one first compound line R41, and then the first compound line R41 may be connected to the first winding drum 734'''.

In addition, a plurality of second connection ropes R2 (e.g., three) may be provided from the auxiliary balancing device 80, and the plurality of second connection ropes R2 may be formed into one second compound line R42, and then first compound line R41 may be connected to the first winding drum 734'''.

Similarly, a plurality of third connection ropes R3 (e.g., three) may be provided from the auxiliary balancing device 80, and the plurality of third connection ropes R3 may be formed into one first compound line R41, and then the third compound line R43 may be connected to the first winding drum 734'''.

As such, a greater force may be stably applied from the auxiliary balancing device 80 to the driving shaft by providing a plurality of the first connection ropes R1 to third connection ropes R3, and then forming the plurality of first connection ropes R1 into one first compound line R41, the plurality of second connection ropes R2 into one second compound line R42, and the plurality of third connection ropes R3 into one third compound line R43.

Although the balancing apparatus 10 and the balancing system 1 including the same according to the embodiments of the present invention have been described as specific embodiments, these are merely examples, and the present invention is not limited thereto and should be interpreted to have the broadest scope according to the basic spirit disclosed in the specification. Those skilled in the art may combine or substitute the disclosed embodiments to implement embodiments not disclosed herein, but this does not depart from the scope of the present invention. In addition, those skilled in the art may easily change or modify the disclosed embodiments on the basis of the specification, and it is clear that such changes or modifications also fall within the scope of the present invention.

DESCRIPTION OF THE SYMBOLS

1: balancing system
1': balancing system
1'': balancing system
10: balancing apparatus
10'': balancing apparatus
10''': balancing apparatus
10'''': balancing apparatus
100: center gear part
100': center gear part
100'': center gear part
100''': center gear part
1000: supporter
110: first center gear
110': first center gear
110'': first center gear
110''': first center gear
1111: indirect connection means
120: second center gear
120': second center gear
120'': second center gear
120''': second center gear
20: elevator winding drum
20': elevator winding drum
20'': elevator winding drum
20''': elevator winding drum
200: outer gear part
200': outer gear part
200'': outer gear part
200''': outer gear part
210: first outer gear
210'': first outer gear
210''': first outer gear
220: second outer gear
220'': second outer gear
220''': second outer gear
30: elevator car
30': elevator car
30'': elevator car
300: auxiliary gear
310: first auxiliary gear
320: second auxiliary gear
40: wire guiding device
400: moving part
410: balancing weight
48: rope guiding part
510: load control part
52: first connection gear
520: power part
524: power control box
526: control valve
54: second connection gear
600: roller
61: deceleration motor
62: first break
64: second break
70: power connection part
70': power connection part
70'': power connection part
700: support part
712: third gear
712': third gear
714: third winding drum
722: second gear
724: second winding drum
732: first gear
734: first winding drum
80: auxiliary balancing device
80': auxiliary balancing device
80'': auxiliary balancing device
810: balancing bar
812: first fixing part
814: second fixing part
816: third fixing part
819: moving weight
822: upper fixing part
824: side fixing part
826: lower fixing part
832: first roller
834: second roller
842: fifth roller
844: sixth roller
846: seventh roller
852: third roller
854: fourth roller
862: moving weight movement line
864: control box
910: first buffer device
912: fourth gear
914: fifth gear

916: sixth gear
918: seventh gear
920: buffer device
L1: first driving shaft
L1': first driving shaft
L1": first driving shaft
L1''': first driving shaft
L2: second driving shaft
L3: third driving shaft
L6: sixth driving shaft
L7: seventh driving shaft
L8: eighth driving shaft
R1: first connection rope
R2: second connection rope
R3: third connection rope
R41: first compound line
R42: second compound line
R43: third compound line
734''': first winding drum
724''': second winding drum
714''': third winding drum
991: first connection drum
992: second connection drum
993: third connection drum
994: fourth connection drum
L11: eleventh driving shaft
L12: twelfth driving shaft
L13: thirteenth driving shaft

INDUSTRIAL APPLICABILITY

The balancing apparatus and balancing system including the same of the present invention are industrially applicable.

What is claimed is:

1. A balancing apparatus comprising:
an elevator winding drum connected to an elevator car;
a center gear part connected to a first driving shaft of the elevator winding drum and including a first center gear; and
an outer gear part including a first outer gear which contacts and rotates with the first center gear;
a moving part which is relatively movable with respect to the center gear part in a state in which the moving part is connected to the outer gear part; and
a balancing weight which is disposed at one side of the moving part; and
a load control part capable of applying a force to the moving part, wherein, when the elevator winding drum receives a force in a first direction by the elevator car, the center gear part applies a force with respect to the elevator winding drum in an opposite direction of the first direction by a force applied from the outer gear part,
when the moving part is moved down by the load control part, the outer gear part rotate the center gear part,
wherein the center gear part includes:
a first center gear and a second center gear which rotate in contact with each other, and
the first center gear is connected to the first driving shaft,
wherein the outer gear part includes:
a first outer gear engaged with the first center gear; and
a second outer gear engaged with the second center gear,
wherein the first center gear and the second center gear are fixed in the gravity direction, and the first outer gear and the second outer gear are provided so as to be movable in the gravity direction.

2. A balancing system comprising:
the balancing apparatus according to claim 1;
a power connection part connected to the first driving shaft; and
an auxiliary balancing device capable of applying a force to the first driving shaft through the power connection part.

3. The balancing system of claim 2, wherein the auxiliary balancing device includes:
a plurality of connection ropes connected to the power connection part; and
a balancing bar fixing the connection rope at one side and provided with a moving weight at the other side thereof, and a force applied from the balancing bar to the power connection part varies according to a position of the moving weight,
wherein the auxiliary balancing device and the power connection part are connected through a first connection rope, a second connection rope, and a third connection rope,
wherein the first connection rope applies force to rotate a first gear of the power connection part,
wherein the second connection rope applies force to rotate a third gear of the power connection part,
wherein the third connection rope applies force to rotate a second gear of the power connection part,
when the third gear rotates clockwise, the second gear and the first gear rotate counterclockwise, and,
when a force is generated by the movement of the moving weight to raise the third connection rope, the third connection rope rotates the second gear counterclockwise, and as the second gear rotates counterclockwise, the third gear rotates clockwise to pull the second connection rope and simultaneously rotates the first driving shaft to offset the force applied from the elevator car.

4. The balancing system of claim 3, wherein the plurality of connection ropes are connected to the balancing bar through a roller disposed at an upper side of the balancing bar and a roller disposed at a lower side of the balancing bar.

5. The balancing system of claim 2, wherein the balancing system includes:
a plurality of first center gears disposed in parallel and spaced apart from each other;
a plurality of second center gears disposed in parallel and spaced apart from each other;
the first outer gear directly connected to one first center gear and the second outer gear directly connected to one second center gear; and
the first outer gear indirectly connected to the other first center gear and the second outer gear indirectly connected to the other second center gear.

* * * * *